United States Patent
Madaan et al.

(10) Patent No.: US 10,521,401 B2
(45) Date of Patent: Dec. 31, 2019

(54) DATA OBJECT LOCKDOWN

(71) Applicant: NetApp Inc., Sunnyvale, CA (US)

(72) Inventors: Raman Madaan, Saharanpur (IN); Akshatha Gangadharaiah, Bangalore (IN); Vaiapuri Ramasubramaniam, Karnataka (IN); Balamurugan Ramajeyam, Chennai (IN); Aftab Ahman Ansari, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 562 days.

(21) Appl. No.: 14/838,776

(22) Filed: Aug. 28, 2015

(65) Prior Publication Data

US 2017/0060897 A1    Mar. 2, 2017

(51) Int. Cl.
*G06F 16/176*   (2019.01)
*H04L 29/06*    (2006.01)

(52) U.S. Cl.
CPC ........ *G06F 16/1774* (2019.01); *H04L 63/108* (2013.01)

(58) Field of Classification Search
None
See application file for complete search history.

(56) References Cited

U.S. PATENT DOCUMENTS

| | | | |
|---|---|---|---|
| 9,514,150 B2* | 12/2016 | Sparkes | G06F 17/30188 |
| 2005/0097260 A1* | 5/2005 | McGovern | G06F 3/0623 |
| | | | 711/100 |
| 2007/0174565 A1* | 7/2007 | Merrick | G06F 17/30085 |
| | | | 711/161 |
| 2014/0317157 A1* | 10/2014 | Sparkes | G06F 16/181 |
| | | | 707/822 |

* cited by examiner

*Primary Examiner* — Giuseppi Giuliani
(74) *Attorney, Agent, or Firm* — Cooper Legal Group, LLC (57) ABSTRACT

One or more techniques and/or computing devices are provided for data object retention. For example, a data retention policy may specify that files of a volume are to be locked down for a lockdown retention period (e.g., locked into a read only state for 4 months) when such files are not changed within an auto commit time period (e.g., files not changed within 13 hours). Waiting for a data scanner to evaluate files for lockdown may result in files violating the data retention policy until the data scanner evaluates such files. Accordingly, a file may be considered to be in the locked down state (e.g., instantaneous lockdown), such that commands to modify or delete the file are blocked, based upon a difference between a current time of an internal compliance clock and a current value of a data object change field exceeding the auto commit time period.

20 Claims, 9 Drawing Sheets

DATA OBJECT LOCKDOWN

BACKGROUND

Many security compliance policies, such as corporate or government data retention policies, may specify that data is to be retained without modification for a specified period of time. For example, compliance storage may provide data retention with write-once-read-many (WORM) access for retained data. A compliance application may be specifically developed to implement a data retention policy for a certain application or set of applications. For example, the compliance application may understand how data is maintained by a database application. Accordingly, the compliance application may copy data, satisfying the data retention policy (e.g., database data that has not been modified for at least 3 days), from primary storage used by the database application to the compliance storage for lockdown for a lockdown retention period (e.g., the data may be retained in the compliance storage, with WORM access, for 2 months).

Some computing environments may not have access to a compliance application that understands how to implement a data retention policy for a particular application (e.g., a storage server may not have access to a compliance application; the storage server may host a custom storage application for which a compliance application does not understand how to implement a data retention policy; etc.). Accordingly, a data scanner may be configured to implement auto commit functionality. The data scanner may periodically or continuously walk a data container, such as a volume, to identify and commit files to compliance storage for data retention. For example, the data scanner may auto commit files to compliance storage for lockdown by identifying files that not have been modified for an auto commit time period, such as 3 days. Unfortunately, the data scanner cannot instantaneously traverse the data container, and thus files may not be auto committed to compliance storage at a time when such files satisfy the auto commit time period (e.g., 5 minutes may lapse from when a file has satisfied the 3 day data retention criteria and the data scanner evaluating the file for auto commit to compliance storage). Thus, the data retention policy may not be adequately satisfied and/or security vulnerabilities or data loss may occur. Additionally, the data scanner may utilize a system clock, which may be vulnerable to malicious tampering by a user or storage administrator, for determining how long a file has gone unmodified. As more data containers, such as volumes, are to be monitored by the compliance application, the compliance application may be unable to scale appropriately because the compliance application scans each data container for identifying data for compliance storage lockdown.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for data object lockdown are provided. For example, many polices may specify that data is to be locked down into a protected state for data retention purposes, such as being stored with write-once-read-many (WORM) access. Because a data scanner may periodically or continuously scan files to determine which files satisfy a data retention criteria (e.g., files that have not been modified within an auto commit time period may be stored into lockdown retention storage for a lockdown retention period), a file may satisfy the data retention criteria before the file is reached by the data scanner. Thus, the file may remain in a non-locked down state for longer than what is allowed by a data retention policy. Accordingly, as provided herein, a file may be considered to be in a locked down state when (e.g., instantaneously, within a threshold timespan, etc.) a difference between a current time of an internal compliance clock and a current value of a data object change field within an inode of the file exceeds the auto commit time period, regardless of whether the data scanner has reached or not reached the file for data retention evaluation. For example, responsive to receiving a command to modify or delete the file, the file may be evaluated to determine whether the data retention criteria is satisfied, and if so, the command may be blocked. In this way, files may be instantaneously considered locked down, for example, which may guarantee that the files are considered as locked down at the instance such files are to be considered locked down. Because the internal compliance clock (e.g., a tampered resistance software clock) is used, instead of a system clock that could be tampered with by a user or storage administrator, data object lockdown evaluation may be tamper resistant. Thus, secure data retention of data objects may be achieved in a scalable manner (e.g., the data scanner may otherwise be unable to scale for a large number of volumes because the data scanner walks each volume).

Figure 1:
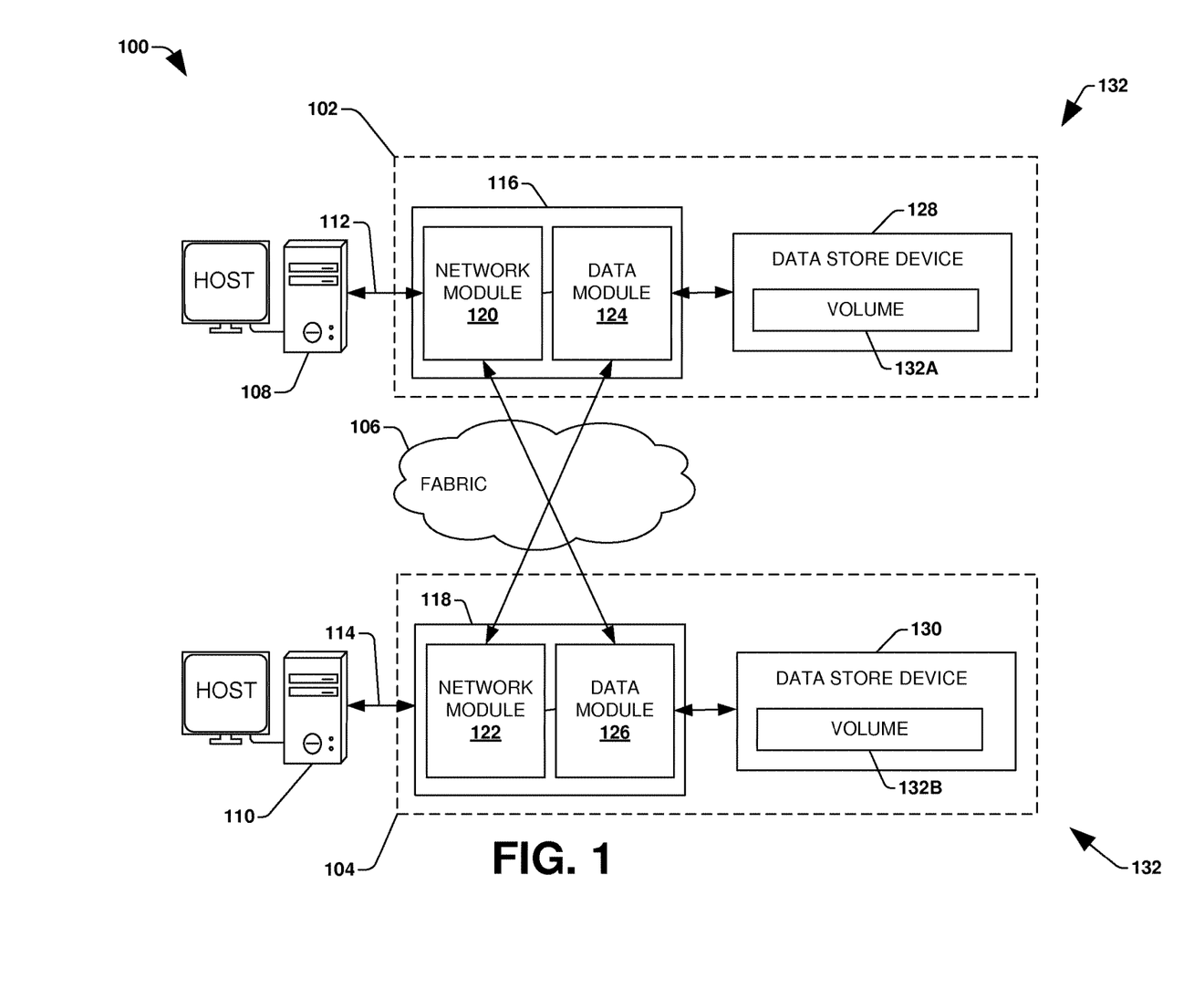
FIG. 1 is a component block diagram illustrating an example clustered network in accordance with one or more of the provisions set forth herein.

To provide context for data object lockdown, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that data object lockdown may be implemented within the clustered network environment 100. For example, files stored within volume 132A and/or volume 132B may be considered locked down based upon a data retention criteria being satisfied (e.g., locked down within a threshold timespan of the data retention criteria being satisfied, instantaneously locked down when the data retention criteria is satisfied, etc.). The data retention criteria may correspond to a difference between a current time of an internal compliance clock and a current value of a file (e.g., a change value) exceeding an auto commit time period. It may be appreciated that data object lockdown may be implemented for and/or between any type of computing environment, and may be transferrable between physical devices (e.g., node 116, node 118, etc.) and/or a cloud computing environment (e.g., remote to the clustered network environment 100).

Figure 2:
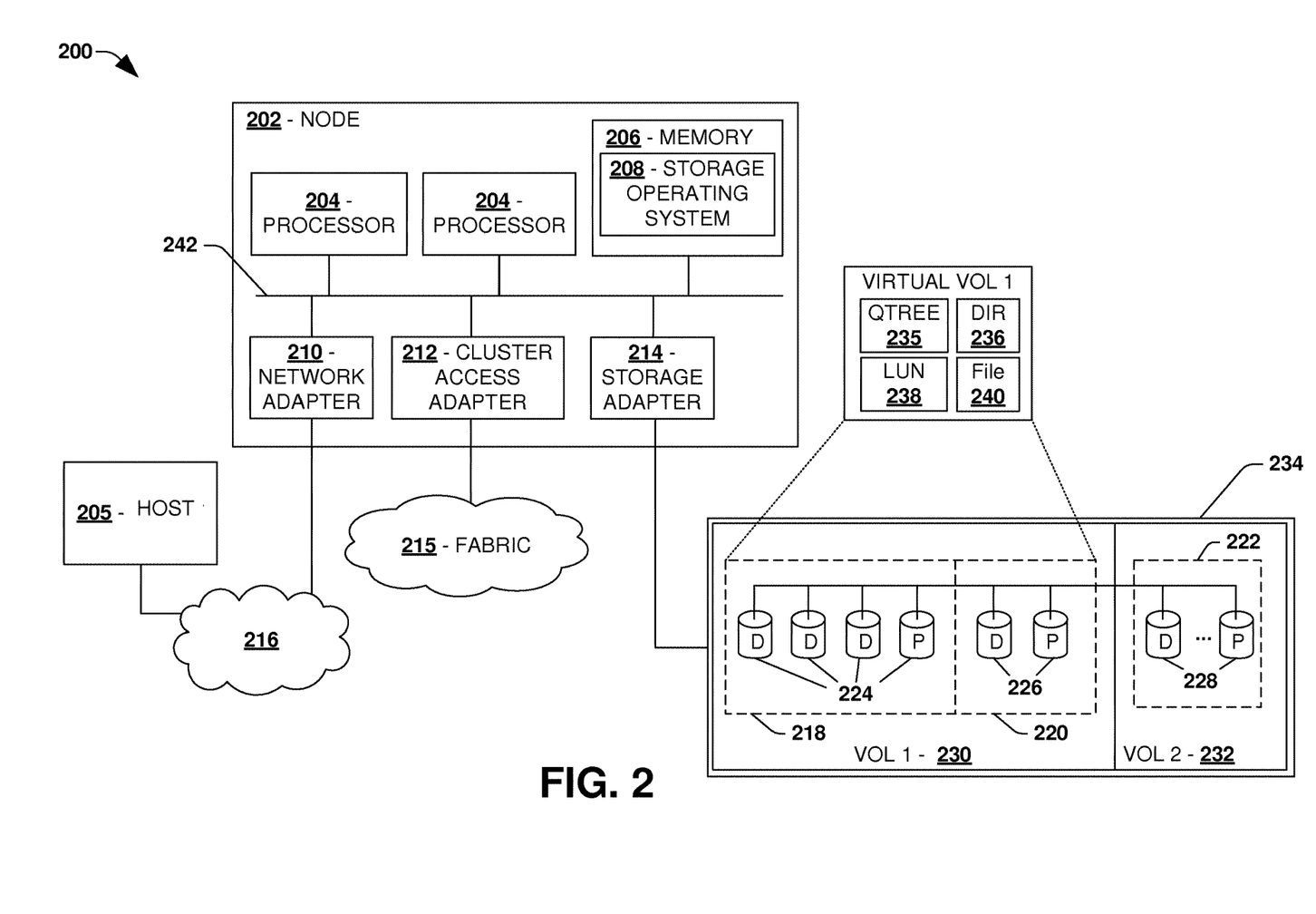
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that data object lockdown may be implemented for the data storage system 200. For example, files stored within volume 230 and/or volume 232 may be considered locked down based upon a data retention criteria being satisfied (e.g., locked down within a threshold timespan of the data retention criteria being satisfied, instantaneously locked down when the data retention criteria is satisfied, etc.). The data retention criteria may correspond to a difference between a current time of an internal compliance clock and a current value of a file (e.g., a value of change time) exceeding an auto commit time period. It may be appreciated that data object lockdown may be implemented for and/or between any type of computing environment, and may be transferrable between physical devices (e.g., node 202, host 205, etc.) and/or a cloud computing environment (e.g., remote to the node 202 and/or the host 205).

Figure 3:
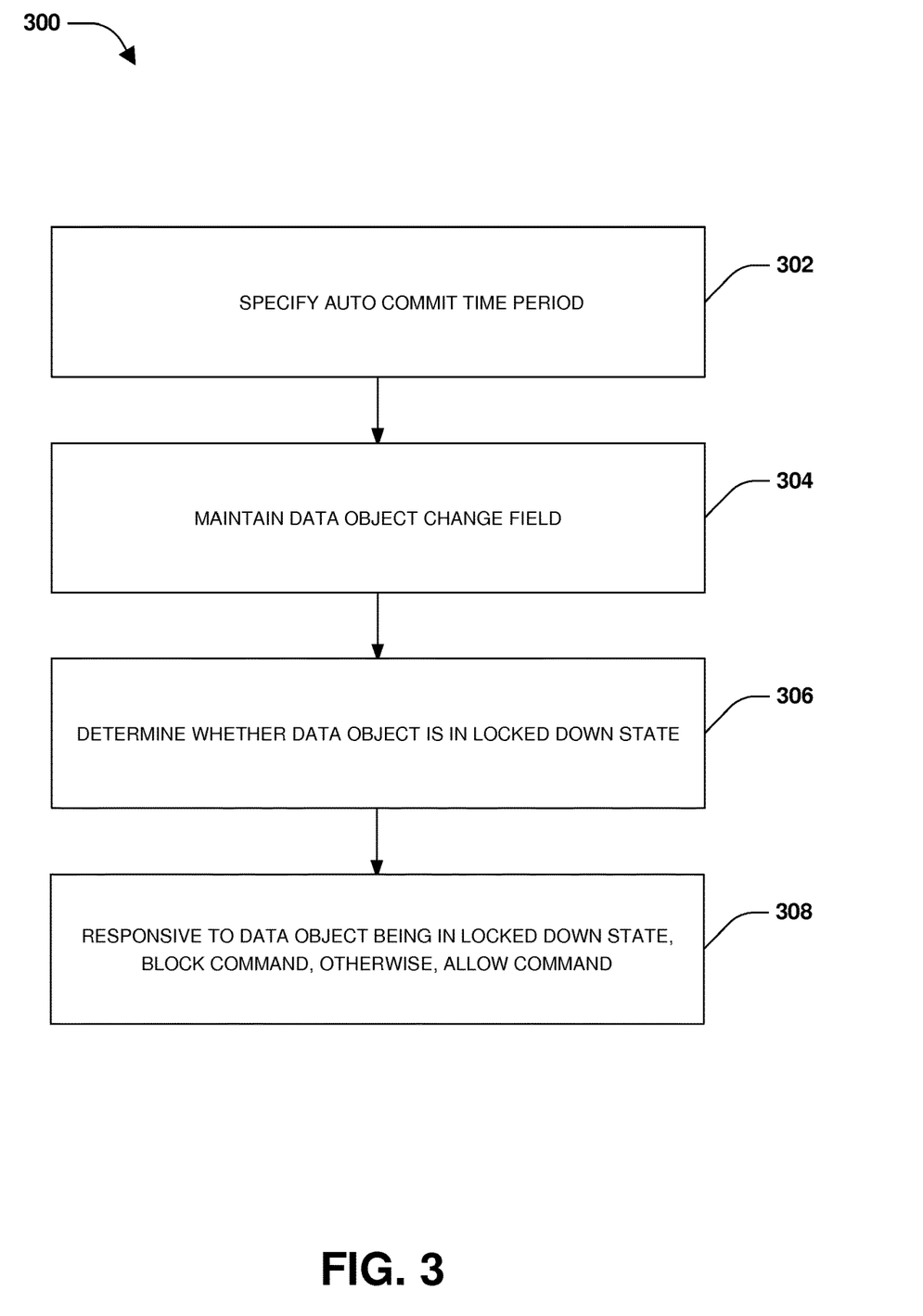
FIG. 3 is a flow chart illustrating an exemplary method of data object lockdown.

One embodiment of data object lockdown is illustrated by an exemplary method 300 of FIG. 3. A data retention policy may specify a data retention criteria where data is to be committed to lockdown retention storage for a lockdown retention period (e.g., stored with read only access for 4 months) if the data has not been modified within an auto commit time period (e.g., 35 hours). For example, a data scanner may scan files of a volume to identify files that satisfy the data retention criteria, and may copy such files into the lockdown retention storage in a locked down state (e.g., read only access). Because files may satisfy the data retention criteria before the data scanner reaches such files for commitment to the lockdown retention storage, which may violate the data retention policy, it may be advantageous to determine whether files are to be considered to be in the locked down state sooner (e.g., instantaneous auto commit).

Accordingly, an auto commit time period for a data object may be specified, at 302. The auto commit time period may be set based upon a data retention policy or may be user specified. The auto commit time period may indicate that the data object is to be locked into a locked down state for a lockdown retention period based upon the data object not being changed for the auto commit time period. For example, a user may specify a 32 hour auto commit time period for a data container of data objects such as a volume of files, such that files within the volume are to be auto committed to lockdown retention storage for 5 months (e.g., the files are locked down such that the files may be read, but not modified or deleted) if such files have not been modified (e.g., modification corresponding to a type of access to the file that may result in an update to a change time field of an inode of a file) within 32 hours.

At 304, a data object change field may be maintained within a metadata structure associated with the data object. For example, the data object change field may comprise a file change field added into the inode of the file. Responsive to a change to the data object (e.g., an update occurring to the change time field of the inode indicative of the change to the file, such as a file modification, a file attribute update, a file permission change, a file relocation, a file ownership change, etc.), the data object change field may be updated based upon a time of the internal compliance clock. In this way, the data object change field is used to track date and time information of changes to the data object according to the internal compliance clock. In an example, a predicted retention time of the data object may be determined based upon a change time of the data object. The predicted retention time may specify a predicted time at which the data object is to be committed to lockdown retention storage in the locked down state.

In an example, the data object may be considered to be committed to the locked down state even though the data scanner may not have encountered the data object yet while walking the data container (e.g., the volume may comprise thousands of files, and the data scanner may have hundreds of files to evaluate before the file). That is, responsive to the internal compliance clock transitioning, at a first time, to a time value that is greater than a sum of the data object change field and the auto commit time period, the data object may be considered as being in the locked down state within a threshold timespan of the first time (e.g., instantaneously or within any other acceptable timespan).

In an example, a command to modify or delete the data object may be received. At 306, the data object may be determined as either being in the locked down state or not based upon a difference between a current time of the internal compliance clock and a current value of the data object change field exceeding the auto commit time period (e.g., an indication that the file has not been modified within the past 32 hours based upon date and time data of the internal compliance clock and the data object change field). At 308, responsive to the data object being in the locked down state (e.g., by virtue of the date and time data of the internal compliance clock and the data object change field indicating that the file has not been modified within the past 32 hours), the command may be blocked, otherwise, the command may be allowed. In this way, the locked down state may be enforced by blocking the command even though the data object has not yet been committed to lockdown retention storage by the data scanner.

In an example, an auto commit time period modification request may be received (e.g., a change from 32 hours to 29 hours). The data scanner may be executed to commit data objects within the data container to the lockdown retention storage based upon the data object change field and the auto commit time period. Responsive to the data scanner traversing the data container, the auto commit time period may be updated based upon the auto commit time period modification request.

In an example, a lockdown retention modification request may be received (e.g., a change from 5 months to 3 months). The data scanner may be executed to commit data object within the data container to the lockdown retention storage based upon the data object change field and the auto commit time period. Responsive to the data scanner traversing the data container, the lockdown retention period may be updated based upon the lockdown retention modification request.

In an example where the data object is comprised with a volume, a speculative volume expiry time for the volume may be maintained based upon a modification time (e.g., a change time) of the data object and/or a lockdown retention period (e.g., a volume default retention period). The speculative volume expiry time may specify a time period after which the volume is allowed to be deleted during a volume auto commit process. In an example, the speculative expiry time may be calculated by adding the lockdown retention period (e.g., the volume default retention period) to the change time at about an instant when the object is changed. In an example, a current volume expiry time may be determined based upon the data object being committed to lockdown retention storage in the locked down state by the data scanner. The current volume expiry time may be compared with the speculative volume expiry time. Responsive to the current volume expiry time being less than the speculative volume expiry time, the current volume expiry time may be set to the speculative volume expiry time.

In an example where the data object is comprised within a data container (e.g., the file stored within the volume) hosted by a first storage server, a replication command may be implemented to replicate the data container from the first storage server to a second storage server as a replicated data container (e.g., a replicated volume stored within one or more storage devices owned by the second storage server). The replicated data container may comprise a replicate data object, corresponding to the data object (e.g., a replicated file), a replicated metadata structure, corresponding to the metadata structure (e.g., a replicated inode), and/or a replicated internal compliance clock corresponding to the internal compliance clock. In this way, lockdown retention for the replicated data container may be implemented (e.g., maintained and/or transferred from the data container hosted by the first storage server) based upon the replicated internal compliance clock and replicated metadata structures.

Figure 4A:
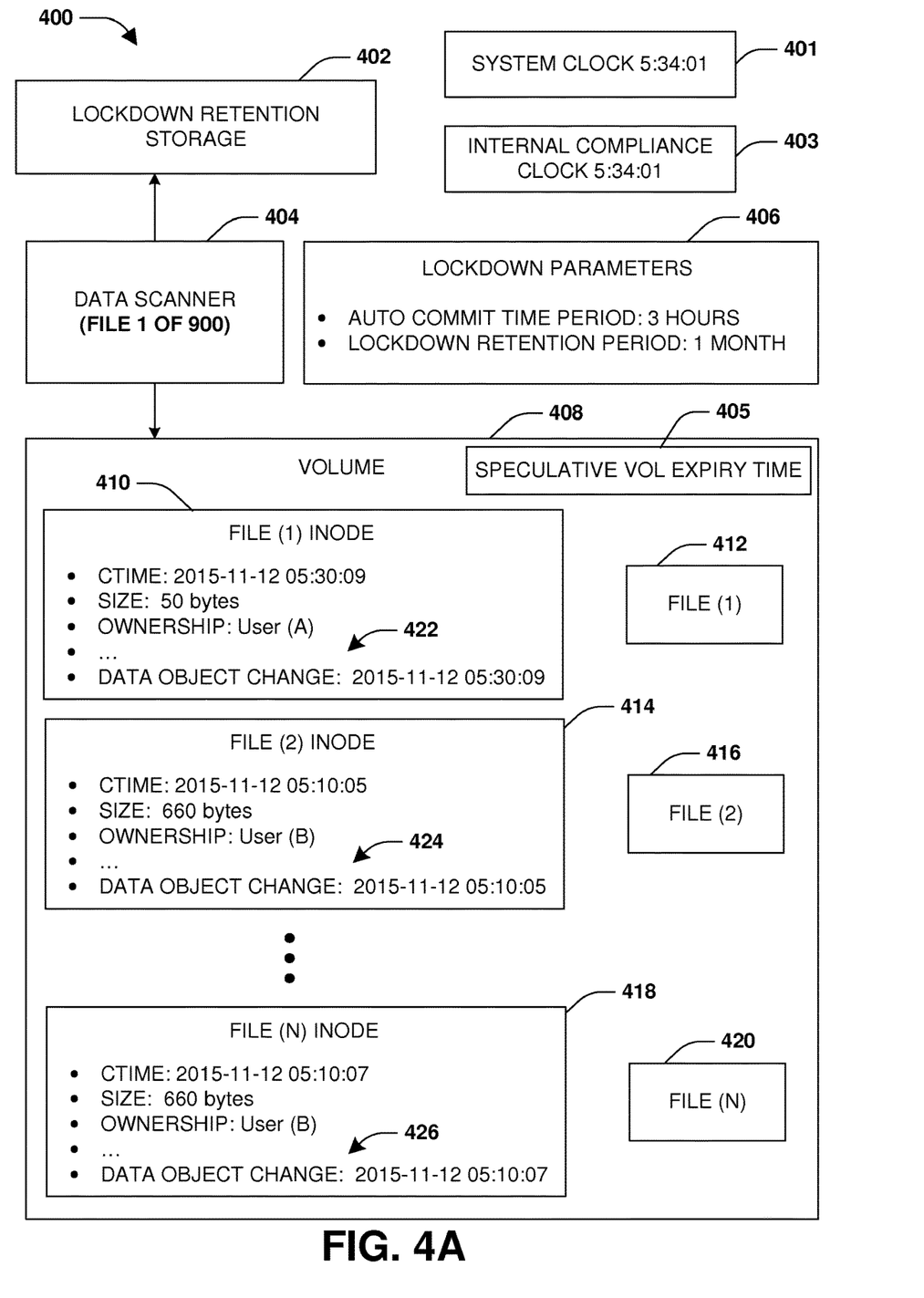
FIG. 4A is a component block diagram illustrating an exemplary computing device for data object lockdown, where data object change fields are maintained within inodes.

FIGS. 4A-4D illustrate examples of a system 400 for data object lockdown. FIG. 4A illustrates a data container, such as a volume 408, comprising one or more data objects, such as a first file 412, a second file 416, an nth file 420 (e.g., a $900^{th}$ file), etc. The files may be associated with inodes that store metadata associated with the files, such as a first inode 410 for the first file 412, a second inode 414 for the second file 416, an nth inode 418 for the nth file 420, etc. A speculative volume expiry time 405 may be maintained for the volume 408 based upon modification times of files (e.g., a change time), creation times of files, and/or a lockdown retention period (e.g., a volume default retention period) for the volume 408. That is, the speculative volume expiry time 405 comprises a sum of the change time of the data object and the lockdown retention period (e.g., the volume default retention period). In an example, the volume 408 may be hosted on a computing device with a system clock 401, which may be vulnerable to being tampered with by users and/or storage administrators. Accordingly, an internal compliance clock 403 may be maintained because the internal compliance clock 403 may be tamper resistant.

Lockdown parameters 406 may be specified for the files of the volume 408. For example, an auto commit time period may indicate that if a file has not been modified within 3 hours, then the file is to be locked down for a lockdown retention period of 1 month. A data scanner 404 may be configured to periodically or continuously walk the volume, such as by evaluating the inodes, to identify files to commit to lockdown retention storage 402 (e.g., files that have not been modified for at least 3 hours).

As provided herein, data object change fields (e.g., a data object change field may be a new field, different than and/or separate from a ctime field, specified within a file inode, or the data object change field may correspond to an overloaded ctime field where a data object change field semantic is used to overload the ctime field within the file inode and the internal compliance clock is used to populate the overloaded ctime field), indicative of when a corresponding file was last modified in terms of the internal compliance clock 403, may be maintained within the inodes. For example, a first data object change field 422, indicating that the first file 412 was last modified at 5:30:09 on Nov. 12, 2015 (e.g., based upon a change time field of the first inode 410), may be maintained within the first inode 410. A second data object change field 424, indicating that the second file 416 was last modified at 5:10:05 on Nov. 12, 2015 (e.g., based upon a change time field of the second inode 414), may be maintained within the second inode 414. An nth data object change field 426, indicating that the nth file 420 was last modified at 5:10:07 on Nov. 12, 2015 (e.g., based upon a change time field of the nth inode 418), may be maintained within the nth inode 418.

Figure 4B:
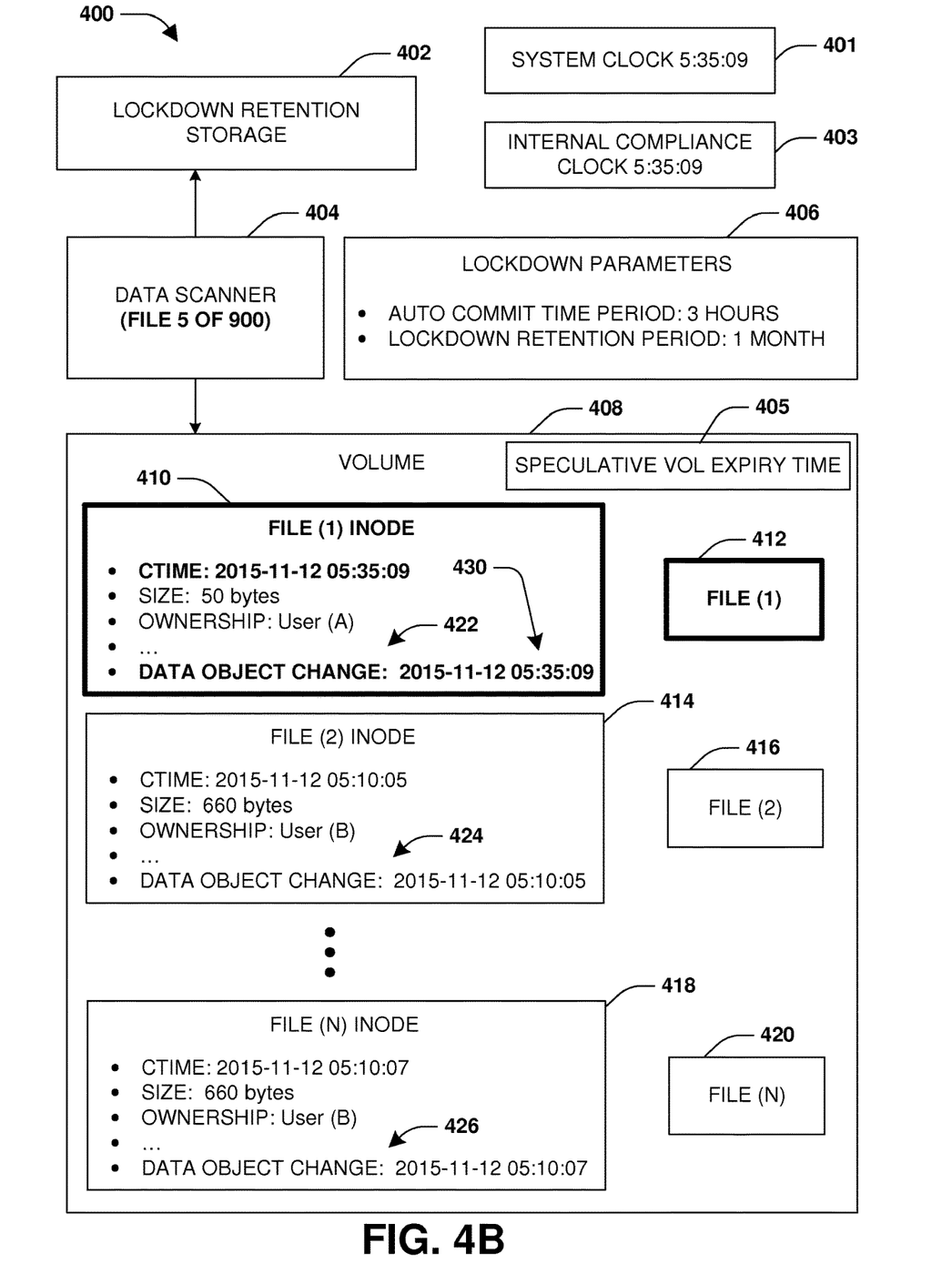
FIG. 4B is a component block diagram illustrating an exemplary computing device for data object lockdown, where a first file is modified.

FIG. 4B illustrates the first file 412 being changed (e.g., new data may be written to the first file 412 at 5:35:09). Responsive to the change, the change time field of the first node 410 may be updated based upon the system clock 401. The first data object change field 422 may be updated 430 to 5:35:09 based upon the internal compliance clock 403. In an example, the data scanner 404 may have traversed from the first file 412 to a fifth file for data retention evaluation.

Figure 4C:
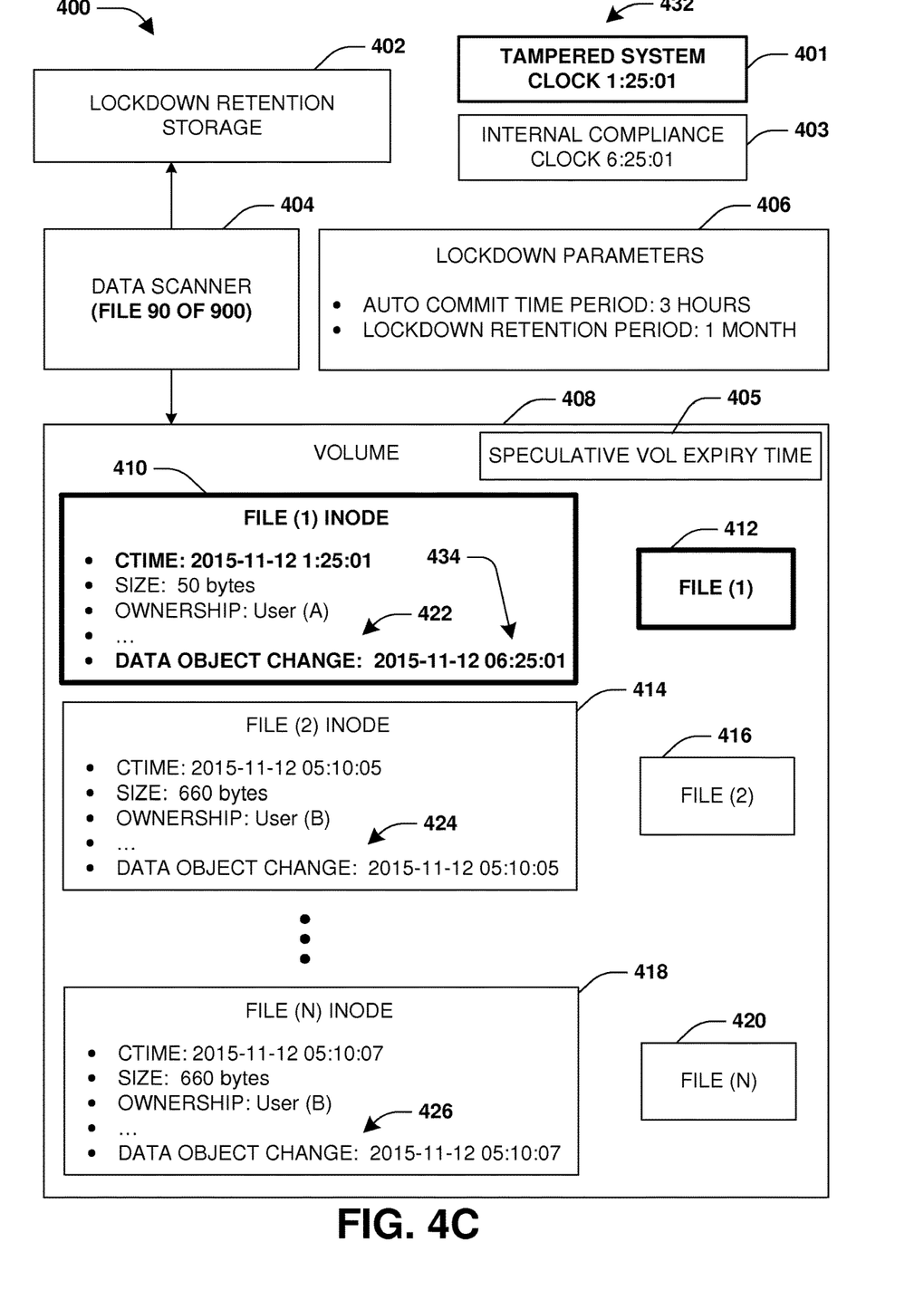
FIG. 4C is a component block diagram illustrating an exemplary computing device for data object lockdown, where a first file is modified and a system clock is tampered with by a storage administrator.

FIG. 4C illustrates the first file 412 being changed (e.g., a file permission for the first file 412 may be changed at 6:25:01) after a storage administrator tampered 432 with the system clock 401. For example, the storage administrator may have set the system clock back by 5 hours. Response to the change to the first file 412, the change time field of the first inode 410 may be updated to 1:25:01 based upon the tampered system clock 401. However, the first data object change field 422 may be updated 434 to 6:25:01 (e.g., a current correct time) based upon the internal compliance clock 403. In an example, the data scanner 404 may have traversed from the fifth file to a ninetieth file for data retention evaluation.

Figure 4D:
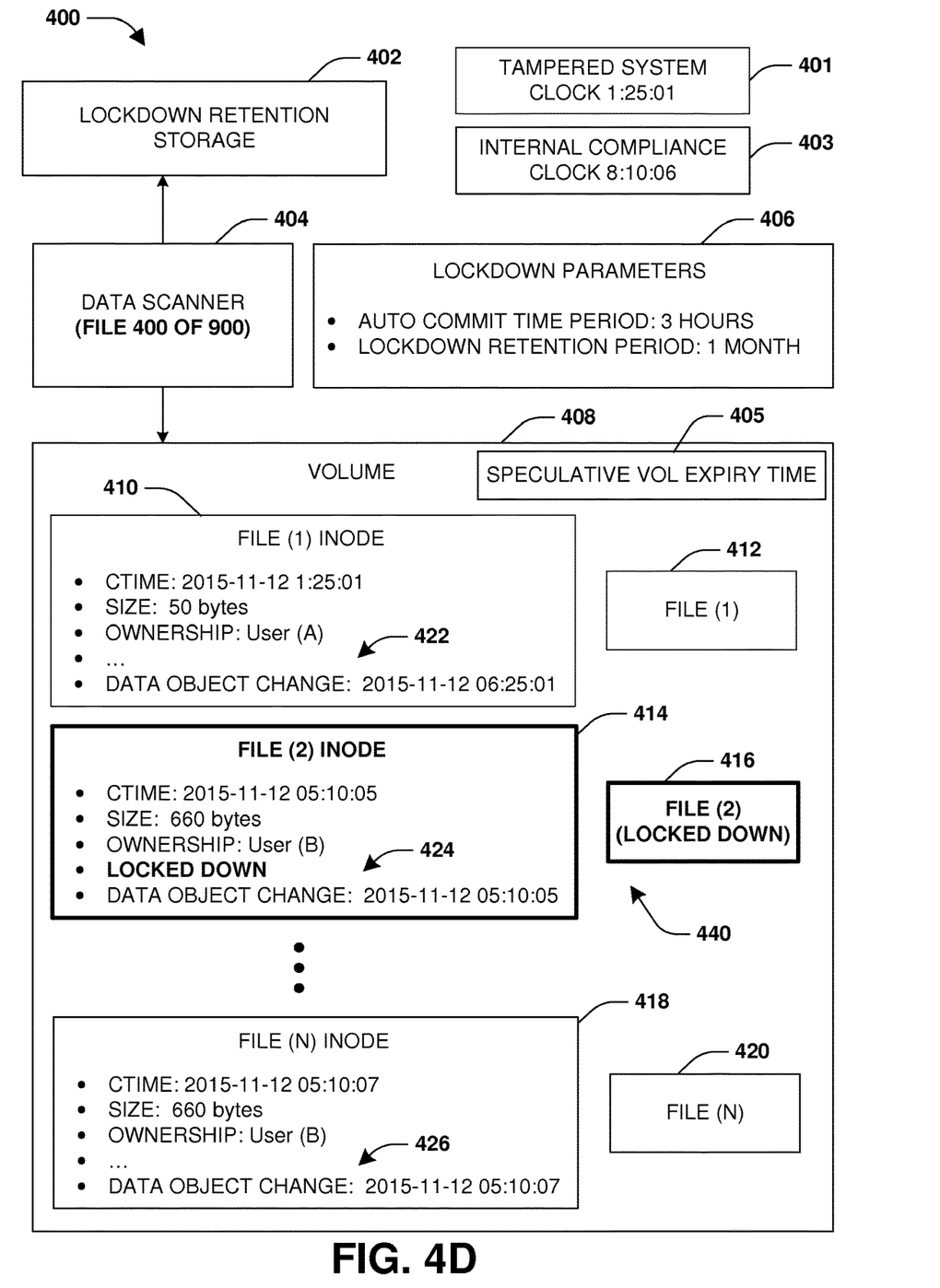
FIG. 4D is a component block diagram illustrating an exemplary computing device for data object lockdown, where a second file is locked down into a locked down state.

FIG. 4D illustrates lockdown 440 of the second file 416 (e.g., instantaneous lockdown based upon satisfaction of a data retention criteria). For example, a data retention criteria may specify that if a difference between a current time of the internal compliance clock 403 and a current value of a data object change field exceed the auto commit time period (e.g., indicating that a corresponding file has not been modified for at least 3 hours), then the corresponding file is deemed to be locked down into a locked down state (e.g., a read only state). For example, responsive to a difference between a current time of 8:10:06 of the internal compliance clock 403 and a current value of 5:10:05 of the second data object change field 424 exceeding the 3 hour auto commit time period, the second file 416 may be deemed as locked down, such that commands used to modify or delete the second file 416 may be blocked. The second file 416 may be locked down even though the data scanner 404 has not yet evaluated the second file 416 for data retention evaluation because the data scanner 404 is currently evaluating a $400^{th}$ file of the volume 408.

Figure 5:
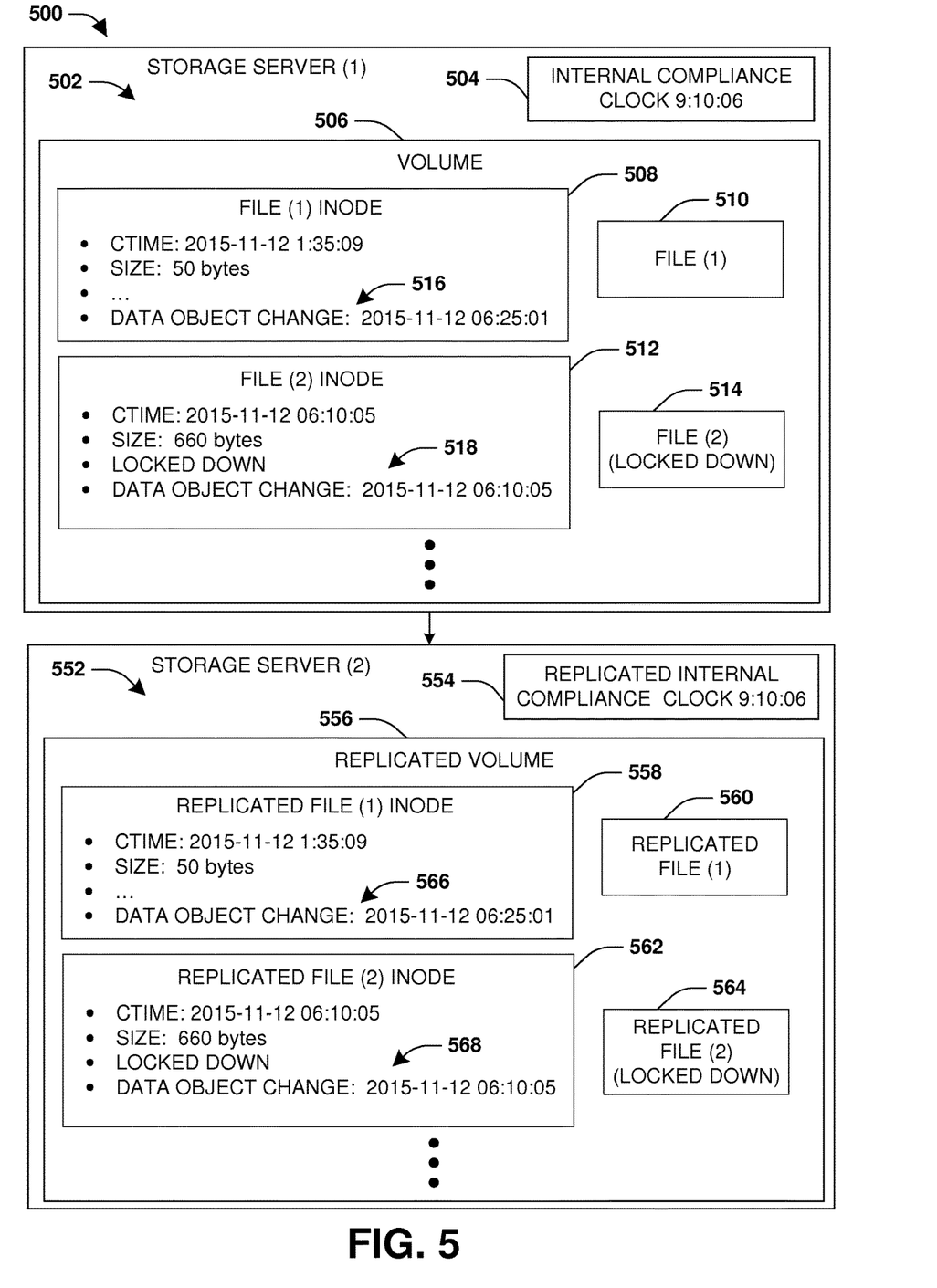
FIG. 5 is a component block diagram illustrating an exemplary computing device for maintaining data retention evaluation after replication.

FIG. 5 illustrates an example of a system 500 for maintaining data retention evaluation after replication. A first storage server 502 may host a volume 506 and an internal compliance clock 504 with a current time of 9:10:06. The volume 506 may comprise a first file 510, a second file 514, and/or other files. The first file 510 may be associated with a first inode 508 within which a first data object change field 516 is specified. The second file 514 may be associated with a second inode 512 within which a second data object change field 518 is specified. Because a difference between a current time of 9:10:06 of the internal compliance clock 504 and a current value of 6:10:05 of the second data object change field 518 exceeds a 3 hour auto commit time period, the second file 514 may be deemed as locked down, such that commands used to modify or delete the second file 514 may be blocked.

A replication command may be implemented at 9:10:06 to replicate the volume 506 and the internal compliance clock 504 from the first storage server 502 to a second storage server 552. In this way, a replicated volume 556, comprising a replicated first file 560, associated with a replicated first inode 558 with a replicated first data object change field 566, a replicated second file 564, associated with a replicated second inode 562 with a replicated second data object change field 568, and/or other replicated data, may be created at the second storage server 552. Because the internal compliance clock 504 is replicated to create a replicated internal compliance clock 554 at the second storage server 552, lockdown retention may be implemented for the replicated volume 556 (e.g., replicated data object change fields and the replicated internal compliance clock 554 may be evaluated against an auto commit time period for determining whether to consider files as being in a locked down state).

Figure 6:
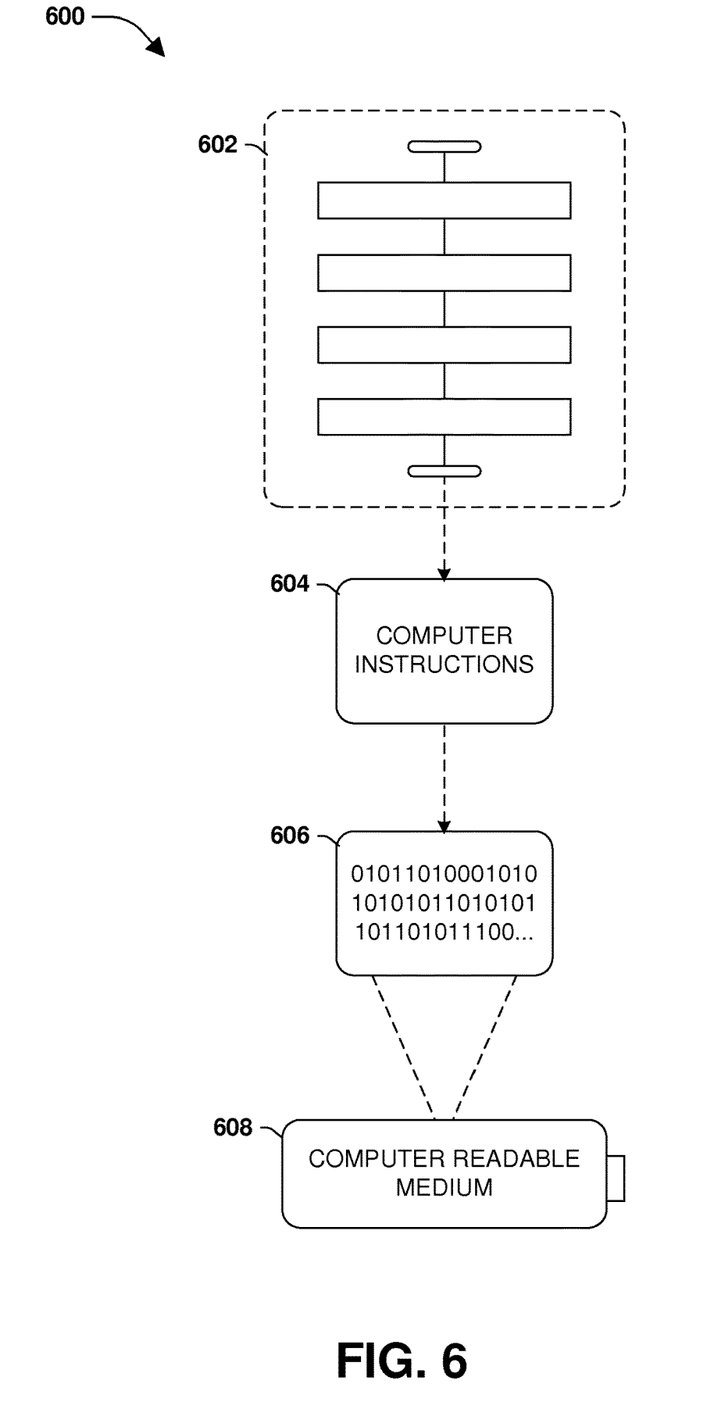
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable instructions 604 are configured to implement a system, such as at least some of the exemplary system 400 of FIGS. 4A-4D and/or at least some of the exemplary system 500 of FIG. 5, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   specifying an auto commit time period for a data container comprising a data object, the auto commit time period indicating that the data object is to be locked into a locked down state for a lockdown retention period based upon the data object not being changed for the auto commit time period, wherein a change time field within an inode associated with the data object is updated with a current time value based upon an attribute change that modifies the inode;
   receiving a command to modify the data object;
   determining whether the data object is in the locked down state based upon a difference between a current time of a clock and a current value of the change time field exceeding the auto commit time period; and
   blocking the command based upon the data object being considered in the locked down state, wherein the command is blocked before a data scanner traverses the data object for committing data objects to lockdown retention storage for the lockdown retention period.

2. The method of claim 1, wherein the data object comprises a file, and the method comprising:
   updating the change time field based upon a file permission change for the file.

3. The method of claim 1, comprising:
   updating the change time field based upon a relocation of the data object.

4. The method of claim 1, the blocking the command comprising:
   updating the auto commit time period of the data container to a new value based upon an auto commit time period modification request.

5. The method of claim 1, comprising:
   executing the data scanner to commit the data objects within the data container to the lockdown retention storage based upon the change time field and the auto commit time period.

6. The method of claim 1, comprising:
   updating the auto commit time period of the data container to a new value based upon an auto commit time period modification request, wherein the update is triggered upon the data scanner traversing the data container for committing the data objects within the data container to the lockdown retention storage.

7. The method of claim 1, comprising:
   updating the lockdown retention period to a new value based upon a lockdown retention period modification request, wherein the update is triggered upon the data scanner traversing the data container for committing the data objects within the data container to lockdown retention storage.

8. The method of claim 1, comprising:
   determining that the clock has transitioned at a first time to a time value that is greater than the change time field and the auto commit time period, wherein the data object is considered as being in the locked down state within a threshold timespan of the first time.

9. The method of claim 1, wherein the data container is hosted by a first computing device, the method comprising:
   implementing a replication command to replicate the data container from the first computing device to a second computing device as a replicated data container comprising a replicated data object corresponding to the data object, a replicated inode corresponding to the inode, and a replicated clock corresponding to the clock, wherein lockdown retention is implemented for the replicated data container.

10. The method of claim 1, wherein the data object is comprised within a volume, the method comprising:
    maintaining a speculative volume expiry time for the volume, the speculative volume expiry time corresponding to a sum of a change time of the data object and a lockdown retention period, the speculative volume expiry time specifying a time period after which the volume is allowed to be deleted during a volume auto commit process.

11. The method of claim 10, the lockdown retention period comprising a volume default retention period for the volume.

12. The method of claim 10, comprising:
    setting a current volume expiry time to the speculative volume expiry time based upon a determination that the current volume expiry time is less than the speculative volume expiry time.

13. The method of claim 12, comprising:
    determining the current volume expiry time based upon the data object being committed to lockdown retention storage in the locked down state by a data scanner.

14. The method of claim 1, comprising:
    determining a predicted retention time of the data object based upon a creation time of the data object, the predicted retention time specifying a predicted time at which the data object is to be committed to lockdown retention storage in the locked down state.

15. A non-transitory machine readable medium having stored thereon instructions, which when executed by a machine, causes the machine to:
    specify an auto commit time period for a data container comprising a file, the auto commit time period indicating that the file is to be locked into a locked down state for a lockdown retention period based upon the file not being changed for the auto commit time period, wherein a change time field within an inode associated with the file is updated with a current time value based upon a file ownership change that modifies the inode;
    receiving a command to modify the file;
    determine whether the file is in the locked down state based upon a difference between a current time of a clock and a current value of the change time field exceeding the auto commit time period; and
    block the command based upon the file being considered in the locked down state, wherein the command is blocked before a data scanner traverses the file for committing files to lockdown retention storage for the lockdown retention period.

16. A computing device comprising:
    a memory comprising machine executable code; and
    a processor coupled to the memory, the processor configured to execute the machine executable code to cause the processor to:
    specify an auto commit time period for a data container comprising a data object, the auto commit time period indicating that the data object is to be locked into a locked down state for a lockdown retention period based upon the data object not being changed for the auto commit time period, wherein a change time field within an inode associated with the data object is updated with a current time value based upon a file permission change that modifies the inode;

receive a command to modify the data object;

determine whether the data object is in the locked down state based upon a difference between a current time of a clock and a current value of the change time field exceeding the auto commit time period; and block the command based upon the data object being considered in the locked down state, wherein the command is blocked before a data scanner traverses the data object for committing data objects to lockdown retention storage for the lockdown retention period.

17. The computing device of claim 16, wherein the machine executable code causes the processor to:

update the lockdown retention period to a new value based upon a lockdown retention period modification request.

18. The computing device of claim 16, wherein the machine executable code causes the processor to:

update the auto commit time period to a new value based upon an auto commit time period modification request, wherein the update is triggered upon a data scanner traversing the data container for committing data objects within the data container to lockdown retention storage.

19. The computing device of claim 16, wherein the data container is hosted by a first computing device, and the machine executable code causes the processor to:

implement a replication command to replicate the data container from the first computing device to a second computing device as a replicated data container comprising a replicated data object corresponding to the data object, a replicated inode corresponding to the inode, and a replicated clock corresponding to the clock, wherein lockdown retention is implemented for the replicated data container.

20. The computing device of claim 16, wherein the machine executable code causes the processor to:

maintain a speculative volume expiry time for the volume, the speculative volume expiry time corresponding to a sum of a change time of the data object and a lockdown retention period, the speculative volume expiry time specifying a time period after which the volume is allowed to be deleted during a volume auto commit process.

* * * * *